April 11, 1939.  H. H. B. LUND  2,153,871
APPARATUS FOR THE GERMINATION OF SEEDS AND THE GROWTH OF SEEDLINGS
Filed July 7, 1937  2 Sheets-Sheet 1
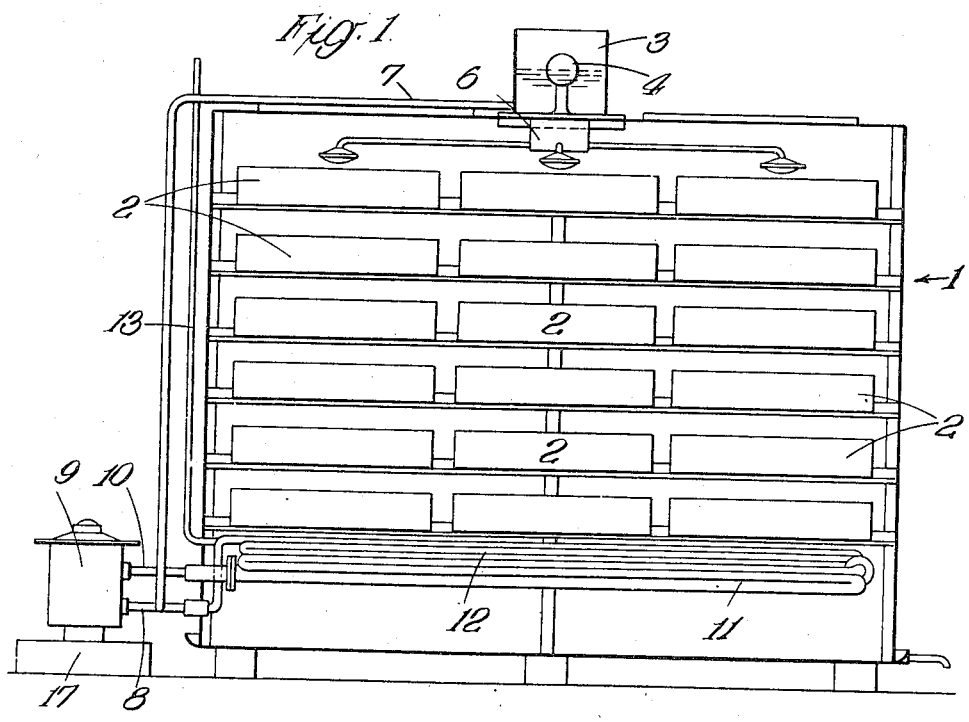
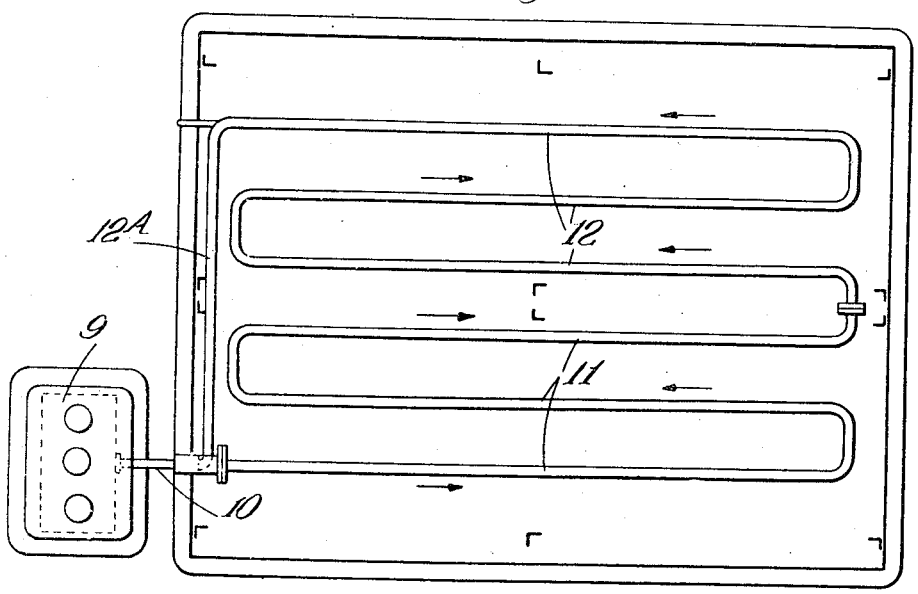
INVENTOR:
HENRY HILTON BLAIR LUND
BY Haseltine, Lake & Co.
ATTORNEYS April 11, 1939.  H. H. B. LUND  2,153,871
APPARATUS FOR THE GERMINATION OF SEEDS AND THE GROWTH OF SEEDLINGS
Filed July 7, 1937  2 Sheets-Sheet 2
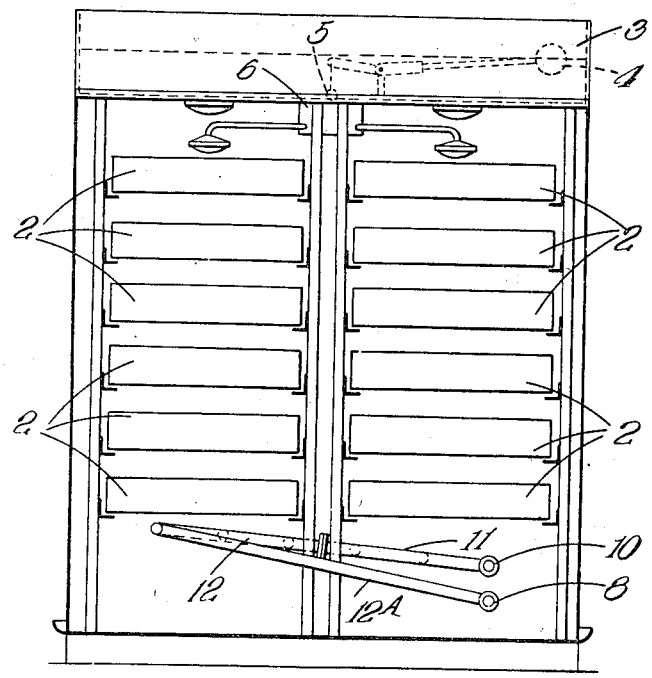
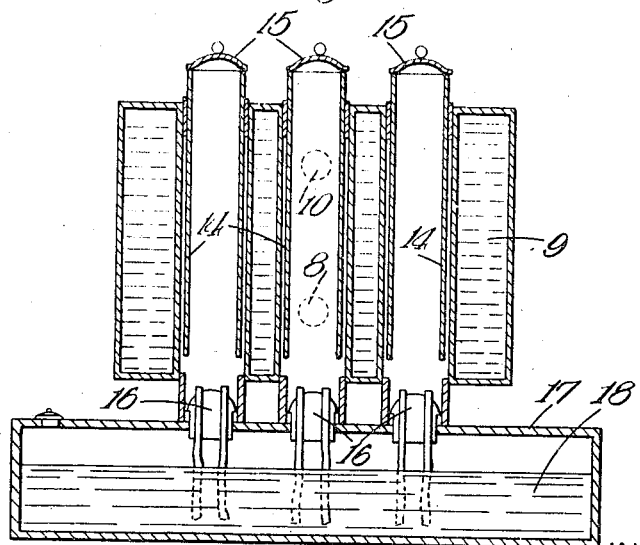
INVENTOR:
HENRY HILTON BLAIR LUND
BY Haseltine, Lake & Co.
ATTORNEYS Patented Apr. 11, 1939

2,153,871

UNITED STATES PATENT OFFICE 2,153,871

APPARATUS FOR THE GERMINATION OF SEEDS AND THE GROWTH OF SEEDLINGS

Henry Hilton Blair Lund, Welwyn Garden City, England,

Application July 7, 1937, Serial No. 152,355
In Great Britain December 31, 1936

2 Claims. (Cl. 47—16)

This invention relates to apparatus for the germination of seeds and the growth of seedlings for human food, fodder and the like, and is concerned with the provision of a soil-less cultivation cabinet of the type consisting of a closed cabinet having means for heating the interior of the cabinet to a desired temperature, and having internally arranged trays for the reception of seeds or seedlings, there being means for supplying a fertilizer liquid to the trays. Various heating means have been proposed for use in cabinets of the above type, but the chief difficulty has been to devise satisfactory heating means capable of withstanding the action of liquid which must eventually fall upon it, if such heating means is arranged within the cabinet itself. Thus, for example, if an oil heater of known type is arranged within the cabinet, difficulties are experienced in preventing the liquid from reaching the wick or wicks of the oil burner whilst at the same time allowing the heat produced by the burner to be completely utilised. In spite of the difficulties indicated in connection with oil heaters, this type of heating means has been used in the apparatus with which the invention is concerned, for the reason that the temperature that has to be maintained in the apparatus should not be very high. As is known in this art, the temperature within the apparatus should only be a few degrees above the prevailing atmospheric temperature. The main function of the heating means is rather to compensate for local atmospheric changes in temperature so that the interior of the apparatus is kept substantially at a uniform temperature. It is, of course, generally known to heat the interior of closed vessels with the aid of steam or hot water pipes. However, in the present instance, it would not be feasible merely to adopt the known method since, generally speaking, the temperature differences in a fluid flow system for heating of the normal known kind would not be sufficiently great, having regard to the desired temperature of the apparatus in the present instance, to afford a satisfactory flow of fluid heating medium.

These disadvantages and difficulties are met in accordance with this present invention by the provision within a cultivation cabinet of the kind indicated, of an internal sinuous pipe system located adjacent the bottom of the cabinet, the heat source being arranged to supply heat to liquid circulated through the pipes within the cabinet, such heat source being external to the cabinet and said pipe system lying generally in a plane that slopes slightly upwardly from the point of introduction of liquid into the system up to the point of withdrawal of the liquid therefrom. By this arrangement, a satisfactory flow of liquid is obtained in the heating system and as a heat source an oil lamp may be employed. Other features of the invention will appear from the following description and in the appended claims.

In order that the invention may be clearly understood and readily carried into effect the same will now be described more fully with reference to the accompanying drawings, in which Figure 1 is a longitudinal sectional view through a cabinet constructed in accordance with the invention, Figures 2 and 3 are respectively sectional plan and end views of the cabinet, and Figure 4 is a sectional elevation through the oil heater unit employed in carrying out the invention.

The cabinet consists of a main body 1 having trays 2 carried within it. The arrangement and disposition of the trays with respect to an overhead sprinkler forms the subject of my co-pending patent application Serial No. 132,055. The overhead system for carrying out sprinkling operations, includes a trough 3 fed by a dribble cock (not shown). The trough 3 contains a ball float 4 operating a ball control valve 5, so that when the height of liquid in the trough reaches a predetermined point, the valve 5 automatically lifts from its seat and allows the liquid from the trough 3 to escape into the sprinkler well 6. Thus the trough 3 has a high level position of the liquid within it, and in the usual way such high level is not exceeded. The trough 3 has a connecting pipe 7 at its lower side, such pipe 7 extending downwardly to join a further pipe 8. The latter is the return pipe of a boiler 9 whose outflow pipe 10 connects with a pipe 11 which follows a sinuous path within the interior of the cabinet. The pipe 11 is connected to a further pipe 12 within the cabinet, the pipe 12 following also a sinuous path within the cabinet. The pipe 12 joins the return flow pipe 8. As will be seen from Figure 3, the pipes 11 and 12 are arranged in a common plane which slopes upwardly from one side of the cabinet to the other. The lowest point of the pipe system 11, 12 corresponds to the outflow connection 10 from the boiler. The system at its highest point is completed by a downwardly sloping extension 12a of the pipe 12, such extension 12a joining the return flow pipe 8 of the boiler. The highest point in the pipe system 11, 12 connects with the lower end of an upwardly extending small bore pipe 13. The pipe 13 extends upwardly a distance such that the end of the pipe is above the high level, referred to above, in the trough 3.

The boiler 9 is shown in Figure 4 and also the heating means employed for heating this boiler. The actual boiler body 9 is formed from sheet copper and is rectangular in shape. Three passages are formed through the boiler body, the passages being arranged to receive chimneys 14 the tops of which have fume caps 15. At the lower end of the chimneys, burners 16 are arranged, the burners illustrated having twin wicks. A tank 17 for the reception of oil 18, has the burners secured in it, suitable automatic wick feed mechanism (not shown) being provided.

When the cabinet described above is in operation, the trays 2 containing seeds and seedlings are arranged in the way indicated in Figures 1 and 3, and fertilizer liquid is periodically supplied to the trays through the sprinkler system. The oil heater heats the water present in the boiler and causes circulation of the water between the boiler and the pipe system. As will be understood, the water in the boiler rises as it is heated by the action of the burners 16, and passes out through the outflow pipe 10 whence it enters the pipe 11 and flows upwardly through such pipe into the pipe 12, giving up heat to the interior of the cabinet and finally leaving through the pipe 12a to escape into the return pipe 8. Cooled water thus flows into the lower part of the boiler 9 through the return pipe 8. Losses of liquid heating medium in the system are made up by a flow of liquid from the trough 3 through the pipe 7. Any tendency for air locks to form in the system will be prevented by the arrangement of the small bore pipe 13.

The fertilizer liquid present in the trough 3 will usually consist of a very large percentage of water with but a small quantity of fertilizer, so that the replacement of losses of liquid in the hot water system by the use of the fertilizer liquid, will not deleteriously affect the hot water system. The temperature rise in the heating system described is comparatively low and this, it will be appreciated, allows replacement of losses of liquid by replenishment from the overhead fertilizer liquid supply, since the small proportion of dissolved fertilizer substance will not be deposited with the small temperature rises which come into question.

As already indicated the heating system described above, is more particularly intended for use in connection with the soil-less cultivation cabinet forming the subject of my co-pending patent application Serial No. 132,055 it will, however, be understood that the described heating system will be equally applicable to cultivation cabinets in which the particular sprinkler system referred to in the specification of my co-pending patent application just mentioned by number, is not employed.

What I claim and desire to secure by Letters Patent of the United States is:

1. A soil-less cultivation apparatus comprising a closed cabinet for the reception of a plurality of trays containing seeds and seedlings, means for supplying a fertilizer liquid to the trays within the cabinet including an overhead supply tank for the said fertilizer liquid, a heat supply source external to the cabinet, an internal sinuous pipe system located adjacent the bottom of the cabinet, a vessel for containing heating liquid arranged adjacent said heat source, an outflow connection from said vessel to said sinuous pipe system, an inflow connection to said vessel from said sinuous pipe system, and a connection between said over-head supply tank for fertilizer liquid and the inflow to said vessel for replenishing the heating liquid in the system, said sinuous pipe system lying generally in a plane which slopes slightly upwardly from the point of introduction of heating liquid into the system up to the point of withdrawal of the liquid therefrom.

2. A soil-less cultivation apparatus comprising a closed cabinet for the reception of a plurality of trays containing seeds and seedlings, means for supplying a fertilizer liquid to the trays within the cabinet, including an overhead supply tank for the said fertilizer liquid, at least one oil burner located external to the cabinet, a jacket around said burner the jacket constituting a vessel to contain the heating liquid, an internal sinuous pipe system located adjacent the bottom of the cabinet, an outflow connection from said vessel to said sinuous pipe system, an inflow connection to said vessel from said sinuous pipe system, and a connection between said overhead supply tank for fertilizer liquid and the inflow to said vessel for replenishing the heating liquid in the system, said sinuous pipe system lying generally in a plane which slopes slightly upwardly from the point of introduction of heating liquid into the system up to the point of withdrawal of the liquid therefrom.

HENRY HILTON BLAIR LUND.